United States Patent [19]

Adachi et al.

[11] Patent Number: 4,517,496
[45] Date of Patent: May 14, 1985

[54] LIGHTING APPARATUS FOR A DISCHARGE LAMP

[75] Inventors: Hiromi Adachi, Kanagawa; Shoichi Iwaya, Tokyo, both of Japan

[73] Assignees: Mitsubishi Denki Kabushiki Kaisha; TDK Electronics Co., Ltd., both of Tokyo, Japan

[21] Appl. No.: 440,224

[22] PCT Filed: Mar. 2, 1982

[86] PCT No.: PCT/JP82/00057
§ 371 Date: Nov. 2, 1982
§ 102(e) Date: Nov. 2, 1982

[87] PCT Pub. No.: WO82/03149
PCT Pub. Date: Sep. 16, 1982

[30] Foreign Application Priority Data

Mar. 2, 1981 [JP] Japan .................................. 56-28383

[51] Int. Cl.$^3$ ............................................. H05B 37/00
[52] U.S. Cl. .................. 315/227 R; 315/244; 315/241 R; 361/321
[58] Field of Search ...................... 315/227, 244, 241; 361/321

[56] References Cited

U.S. PATENT DOCUMENTS

| | | | |
|---|---|---|---|
| 3,975,658 | 8/1976 | Emtage et al. | 315/71 |
| 3,996,495 | 12/1976 | Herman | 315/227 |
| 4,119,886 | 10/1978 | Jyomura et al. | 315/101 |
| 4,347,462 | 8/1982 | Adachi et al. | 315/101 |
| 4,360,762 | 11/1982 | Yamamoto et al. | 361/321 |
| 4,381,476 | 4/1983 | Adachi et al. | 315/101 |

Primary Examiner—Harold Dixon
Attorney, Agent, or Firm—Armstrong, Nikaido, Marmelstein & Kubovcik

[57] ABSTRACT

A lighting apparatus for a discharge lamp in which said lighting apparatus (4) is coupled in series with a discharge lamp (3), said lighting apparatus (4) is composed of a capacitor with a ferroelectric dielectric material having main component Barium-titanate ($BaTiO_3$), said capacitor satisfying the impedance ratio of the first impedance ($Z_1$) which is obtained by measuring current for alternate voltage of 5 volts, to the second impedance ($Z_2$) which is obtained by measuring current for alternate voltage of 500 volt/mm, being less than 1/10 ($Z_2/Z_1$ is less than 1/10), thus, the size of the lighting apparatus is small, and the power loss in the same is reduced.

4 Claims, 17 Drawing Figures

LIGHTING APPARATUS FOR A DISCHARGE LAMP

FIELD OF THE INVENTION

The present invention provides a lighting apparatus for a discharge lamp which is miniaturized and weight-reduced to a substantial degree as compared with conventional lighting apparatus for a discharge lamp. Also, the present invention provides a means to miniaturize and reduce the weight of a discharge lamp having incorporated therein a current limiting element.

BACKGROUND OF THE INVENTION

It is known that current limiting elements or ballasts necessary for lighting a discharge lamp include induction elements such as a magnetic core, such as silicon steel sheet, on which a copper wire is wound, capacitive elements using a dielectric such as plastic film and paper and resistance elements using a nichrome wire. All these elements have enough current capacity necessary for operating a discharge lamp. However, they have the disadvantage that their weights and sizes are large. Moreover, the resistance elements exhibit a high power loss.

Accordingly, an object of the present invention is to improve the above-mentioned disadvantages of the conventional arts and to provide a lighting apparatus for a discharge lamp which is small-sized and exhibits a low power loss.

The lighting apparatus for a discharge lamp according to the present invention is characterized in that there is used a current limiting device utilizing the dependency of an impedance of a ferroelectric polycrystalline ceramic comprising mainly barium titanate on a voltage.

PREFERRED EMBODIMENTS OF THE INVENTION

The present invention is illustrated with reference to a circuit operation of a lighting apparatus for a discharge lamp in which a conventional capacitive element is used as a current limiting element for a discharge lamp, and the characteristics required as the capacitive element.

Figure 1:
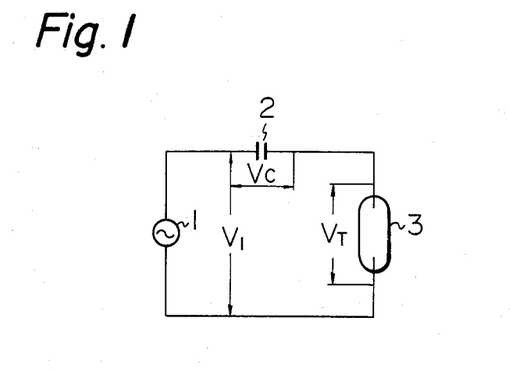
FIG. 1 is a circuit of a lighting apparatus for a discharge lamp using a capacitor as a current limiting element.
Figure 2:
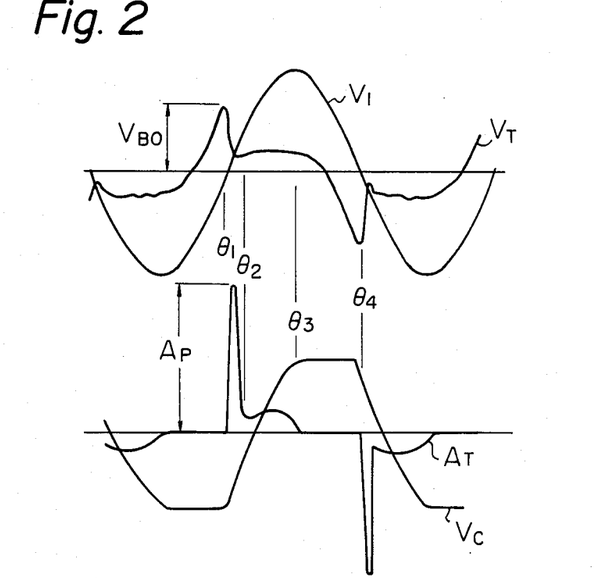
FIG. 2 is a voltage-current wave form for the circuit shown in FIG. 1.

FIG. 1 is a circuit of a lighting apparatus for a discharge lamp. Referring to FIG. 1, the reference numeral 1 represents a source of alternating current, the reference numeral 2 is a conventional capacitor using a conventional dielectric such as paper, and the reference numeral 3 is a discharge lamp. FIG. 2 shows wave forms of the voltage $V_1$ of the current source, the voltage $V_T$ of the discharge lamp, the current $A_T$ of the discharge lamp and the voltage $V_C$ of the capacitor. When the voltage $V_T$ of the discharge lamp reaches the discharge starting voltage ($V_{BO}$) at a phase $\theta_1$, the discharge lamp 3 starts the discharge and a current $A_p$ having a very sharp rise flows from the capacitor 2 into the discharge lamp 3 as the discharge current of the capacitor 2. Thereafter, the current continues to flow until a phase $\theta_3$ at which the voltage $V_1$ reaches the highest level of the wave. Subsequent to the phase $\theta_3$, the voltage $V_1$ enters in a period in which the voltage value is lower than the highest level. Therefore, the current $A_T$ of the discharge lamp flowing from the current source via the capacitor 2 ceases to flow. The period of current interruption continues until a phase $\theta_4$ at which a negative discharge starting voltage is applied to the discharge lamp 3. Thereafter, the same operation consisting of an alternate positive and negative cycle is repeated, so that the discharge lamp 3 continues to discharge.

The lighting apparatus using the capacitor as mentioned above is disadvantageous in that the current at the phase $\theta_1$ has a very high peak value which causes the discharge to be flicked and results in a remarkable reduction in the life of the discharge lamp. In the case where the capacitor is used as the current limiting element, a resistor having a significantly large impedance or an inductance is usually connected in series to the capacitor in order to avoid the above-mentioned disadvantages. However, this countermeasure is disadvantageous in that power loss is generated at the resistor as the size of the inductance becomes large.

As is apparent from the foregoing, it is desirable for realizing a reduction in the size and weight of the capacitive element as the current limiting element for a discharge lamp that the following conditions are satisfied.

(1) After the discharge lamp starts discharge, it is possible to flow a high current between the phases $\theta_2$ and $\theta_3$. For this purpose, the specific dielectric constant $\epsilon_s$ of the capacitive element is made as high as possible so as to cause the capacitive element to have a small volume and a high capacity.

(2) It is possible to lower the current peak value $A_p$ flowing into the discharge lamp at the starting of discharge of the discharge lamp.

In view of the above, the inventors of the present invention paid their attention to the fact that $BaTiO_3$ type ceramic capacitors have a high specific dielectric constant of about 20,000, while a film or paper has a remarkably low specific dielectric constant of from 3 to 15. Then, the present inventors made extensive studies on various ferroelectric ceramic compositions for the purpose of obtaining a high capacitance from compositions having a high dielectric constant $\epsilon_s$, thereby realizing a capacitive current limiting element having a small size and a light weight. As a result of this, the present inventors found that the ceramic composition usable for practical purposes which was obtained has only a specific dielectric constant $\epsilon_s$ of about 20,000 as described above.

In view of the above, the present inventors made various examinations while paying their attention to the dependence of the specific dielectric constant $\epsilon_s$ of the $BaTiO_3$ type ceramic on an alternating current, instead of obtaining a high capacitance from a composition having a high dielectric constant $\epsilon_s$. It is well known that $BaTiO_3$ type ceramic compositions having a high dielectric constant exhibit an increase in apparent dielectric constant $\epsilon_s$ by from about 100 to 140% when an alternating voltage is applied to the compositions, as described in Japanese Patent Application Publication No. 52-44440. Now, the present inventors considered that the change of the specific dielectric constant $\epsilon_s$ by the voltage applied suggests the dependence of the specific dielectric constant $\epsilon_2$, i.e. polarization phenomenon, on a voltage.

In the conventional dielectrics, the dependence of the specific dielectric constant $\epsilon_s$ on a voltage is considered to be negligible, and the dielectric flux density D in the dielectric is determined by the following equation:

$$D = \epsilon E,$$

$$\epsilon = o\epsilon_s$$

wherein D represents a dielectric flux density, $\epsilon_O$ represents a dielectric constant in vacuum, E represents an electric field applied, $\epsilon$ represents a dielectric constant and $\epsilon_s$ represents a specific dielectric constant.

This relationship can be usually obtained by observing a D-E hysteresis by means of a Sawyer-Jower circuit.

Figure 3:
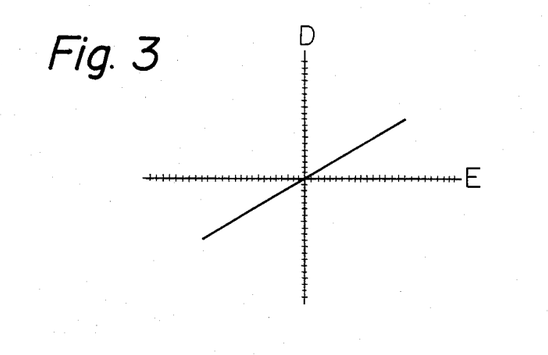
FIG. 3 is a hysteresis curve of a conventional dielectric.
Figure 4:
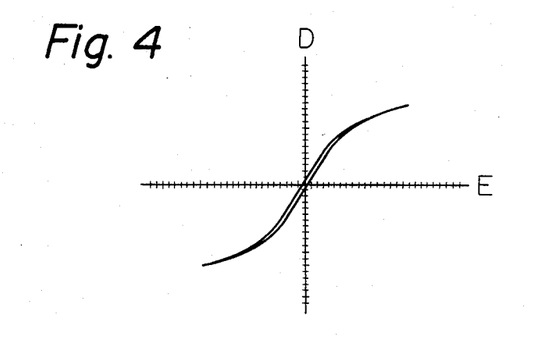
FIG. 4 is a hysteresis curve of a conventional $BaTiO_3$ ceramic having a high dielectric constant.

FIG. 3 shows a D-E hysteresis of a conventional dielectric, while FIG. 4 shows a D-E hysteresis of a $BaTiO_3$ type ceramic dielectric having a high dielectric constant. It is apparent from FIGS. 3 and 4 that the D-E hysteresis loop of the conventional dielectric has a linear relationship (FIG. 3), while the D-E hysteresis loop of the $BaTiO_3$ type ceramic dielectric has no linear relationship, which suggests the dependence of $\epsilon$ on E. The present inventors determined a capacitance-voltage characteristic of a capacitor consisting of the $BaTiO_3$ type ceramic having a high dielectric constant by means of a Schering Bridge. As a reult of this, it was confirmed that the capacitor exhibits almost the same percentage of increase in capacitance as that described in Japanese Patent Application Publication No. 52-44440, i.e. an increase in capacitance of from 2 to 2.4 times.

This phenomenon suggests the following facts. That is, the non-linear relationship of the D-E hysteresis indicates that $\epsilon$ in the equation, $D = \epsilon E$ is varied as a function of the alternating field applied. The sharp rise of the D-E indicates nothing but a rapid increase in $\epsilon$ versus and applied field.

Under these circumstances, the present inventors made earnest studies regarding ceramic compositions having a high percentage of capacitance increase, i.e. a sharp rise of the D-E hysteresis loop. As a result of this, it was found that the use of $BaTiO_3$ alone, a $BaTiO_3$ type ceramic in which a part of Ti in the $BaTiO_3$ is replaced with Sn or Zr or a $BaTiO_3$ type ceramic in which a part of Ba in the $BaTiO_3$ is replaced with Sr or Pb, as a basic component, provide excellent results.

Any ceramics other than $BaTiO_3$ type ceramics exhibited a low capacitance increasing ratio or could not exhibit a high capacitance increasing ratio unless an extremely high alternating field is applied. Therefore, these ceramics were practicably useless in view of the resistance to voltge of these ceramics.

It was further discovered that the addition of a trace amount of a mineralizer (additive) such as an oxide of Mn or Cr to the above-mentioned basic component is effective for preventing reduction during the sintering procedure, for enhancing the sinterability of the component and for providing a more dense and uniform polycrystalline product, without causing any damage to the properties of the resultant product. The properties of the product are variable depending on the type of an additive and the quantity thereof. Mn and Cr are most preferable additives for the basic component of the present invention. The adequate amounts of Mn and Cr to be added were found to be from 0.005 to 0.3% by weight in terms of MnO and from 0.005 to 0.3% by weight in terms of CrO, respectively, based on the weight of the basic component. The addition of a mixture of these two additives also provided excellent results. Moreover, it was found that when the basic component contains a certain amount of impurities, such as $Al_2O_3$, $SiO_2$ and the like, derived from the starting material or the process for producing the basic component, the resultant product exhibits a remarkably deteriorated properties.

These phenomena are considered to be ascribable to the following reasons. Basically, Sr, Sn, Zr and Pb enter into a $BaTiO_3$ crystal to form a solid solution, with the result that they control the properties of the $BaTiO_3$ crystal without deteriorating the ferroelectricity within the crystal grains. Mn and Cr, which are mainly precipitated in the grain boundary, are effective for promiting the sintering of the ceramics and for preventing reduction. These mineralizers themselves are paraelectric and different in electric properties from the crystal grain itself. With regard to this composition, it is essentially necessary to derive the dependence of the specific dielectric constant $\epsilon_s$ on an alternating field, which is a feature of the ferroelectric, as much as possible. For better result, it is preferable that the grain boundary forming the paraelectric layer is as small as possible. The impurities contained in the composition are precipitated in the grain boundary on sintering, thereby forming a paraelectric layer, or they are solid-solubilized in the $BaTiO_3$ crystal, so that the ferroelectricity of the $BaTiO_3$ is deteriorated.

As described above, the inventors of the present invention found the suitability of the $BaTiO_3$ type compositions as a small sized, light weight capacitive current limiting element. Then, the present inventors made various studies on the capacitance increasing ratio of each composition when an alternating current field is applied thereto, that is, the impedance decreasing ratio thereof in the case where the composition is used as the current limiting element and on the phenomena occurred when the composition is used as the current limiting element for a discharge lamp.

The present invention will be illustrated in more detail by the following examples concerning $BaTiO_3$ type compositions and a lighting apparatus for a discharge lamp.

EXAMPLE 1

Powdered raw materials $BaCO_3$, $TiO_2$, $SnO_2$, $ZrO_2$, PbO and $MnCO_3$ were wet mixed by means of a polyethylene pot and agate balls so as to prepare samples having the desired composition Nos. 1 through 15 as shown in indicated in Table 1. After dehydration and drying, each sample was pre-calcined by maintaining it at a temperature of 1150° C. for 2 hours. Then, the pre-calcined sample was again pulverized by means of a polyethylene pot and agate balls. After the moisture was evaporated, the sample was mixed with a suitable amount of a binder and the mixture was press formed into a disc having a diameter of 0.6 mm and a height of 16.5 mm by means of a 10 ton press. The disc was calcined at a temperature of from 1300 K 1400° C. for 2 hours. Silver electrodes were baked on the surfaces of the resultant ceramics element at a temperature of 800° C. and then, lead wires were fixed to the element by means of a solder. After washing, an insulating paint was spread on the element surface. Then, an alternating voltage of 50 Hz was applied to the element and the current and voltage wave forms were observed. The impedance Z of the element was calculated by measuring the effective current obtained when an effective voltage value was varied.

Figure 5:
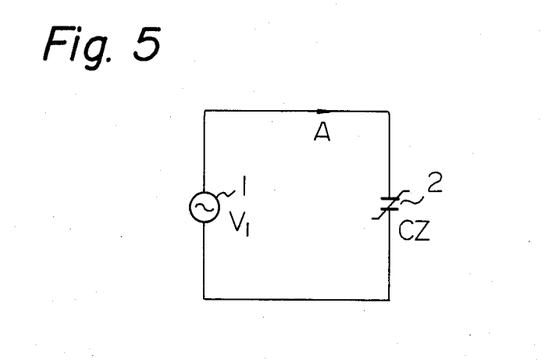
FIG. 5 is a circuit for measuring the characteristics of a current limiting element used in the lighting apparatus for the present invention.

FIG. 5 is a circuit for measuring the effective current. Referring to FIG. 5, the reference numeral 1 represents a 50 Hz alternating current source and the reference numeral 2 represents an element to be measured.

Figure 6:
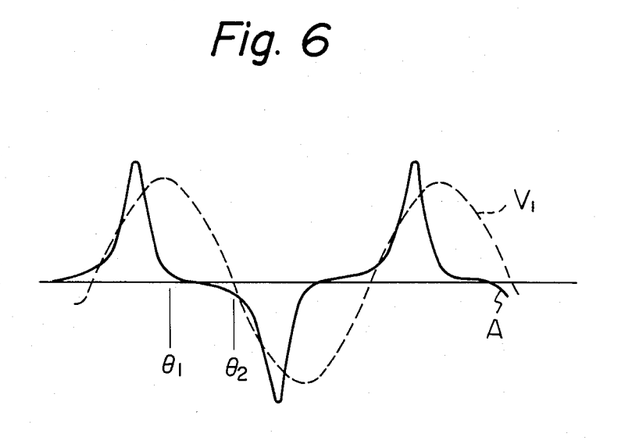
FIG. 6 is a voltage-current wave form of the current limiting element according to the present invention.
Figure 7:
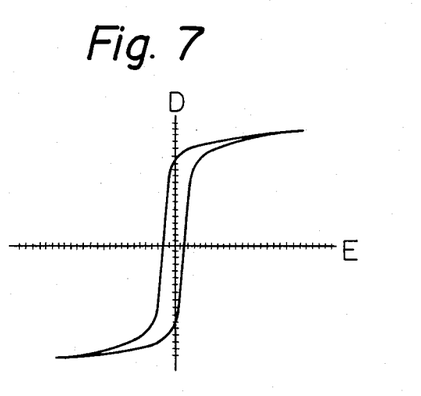
FIG. 7 is a D-E hysteresis characteristic of the current limiting element according to the present invention.

FIG. 6 shows the voltage-current wave form of sample No. 2 of Table 1. FIG. 7 shows the D-E hysteresis characteristic of the same sample. The applied voltage was about 280 V. With regard to samples No. 1 and Nos. 3 through 13, the same characteristics as those shown in FIGS. 6 and 7 where measured.

As is apparent from FIG. 6, the current wave form of the element of the present invention is greatly different from that of the conventional capacitive elements using a dielectric such as paper, a plastic film or a conventional $BaTiO_3$ type procelain.

Comparing the D-E hysteresis as shown in FIG. 7 with that as shown in FIG. 3 or 4, the former has a very sharp rise of the dielectric flux density suggesting a high capacitance increasing ratio. Also, the D-E hysteresis characteristic as shown in FIG. 7 is relative to the alternating voltage-current characteristic which is a feature of the element of the present invention, as described hereinafter.

The distinctive characteristic is as follows:
(1) The current of the element of the present invention advances (loads) about $\frac{1}{8}$ cycle to the voltage, while the conventional capacitive element advances (loads) $\frac{1}{4}$ cycle to the voltage.
(2) During charge to discharge (a period extending from a phase $\theta_1$ to a phase $\theta_2$), a change in current value is far much slower as compared with a sine wave.

These phenomena are considered to be mainly ascribable to the polarization action of the element. Particularly, the slow movement of the current during discharge as indicated in item (2) is very advantageous when the element of the present invention is used as a current limiting element for a discharge lamp.

Figure 8:
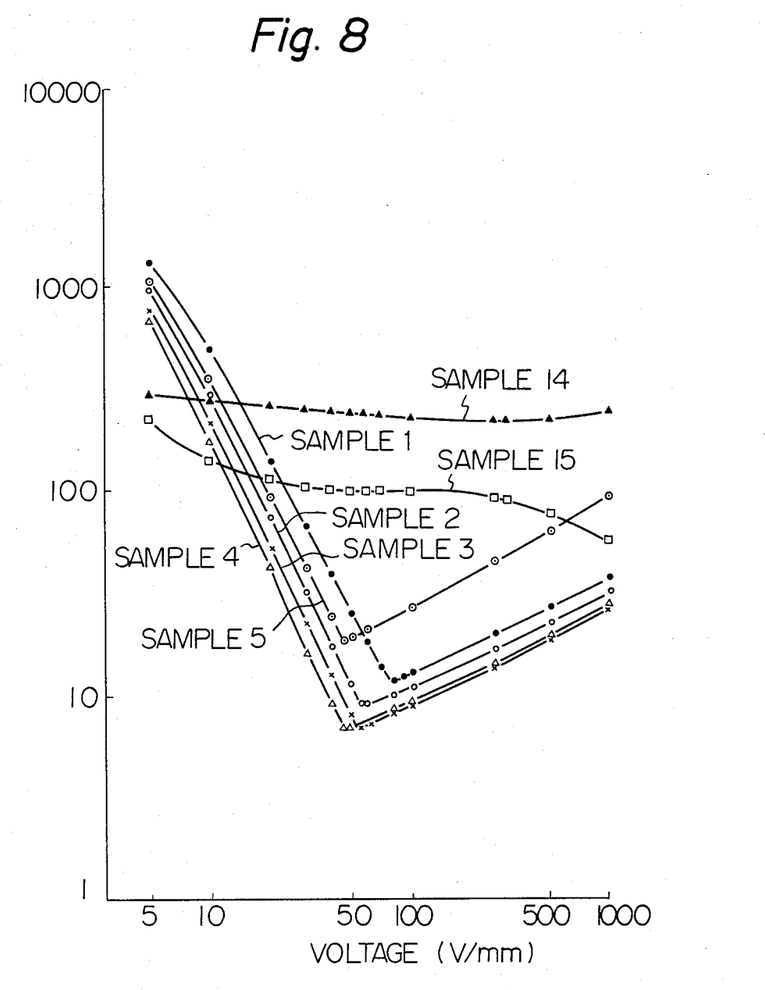
FIGS. 8, 9 and 10 respectively are a graph illustrating experimental results regarding the dependency of an impedance of the current limiting elements according to the present invention on a voltage.

A change in impedance of the element observed when a voltage per unit thickness of the element is varied from 5 to 1000 V/mm is shown in Table 1 and FIG. 8. It is apparent from Table 1 and FIG. 8 that the elements comprising mainly $BaTiO_3$ (except for samples Nos. 14 and 15) exhibit a satisfactory voltage response, i.e. a satisfactory reduction in impedance during the application of an alternating voltage.

EXAMPLE 2

Figure 9:
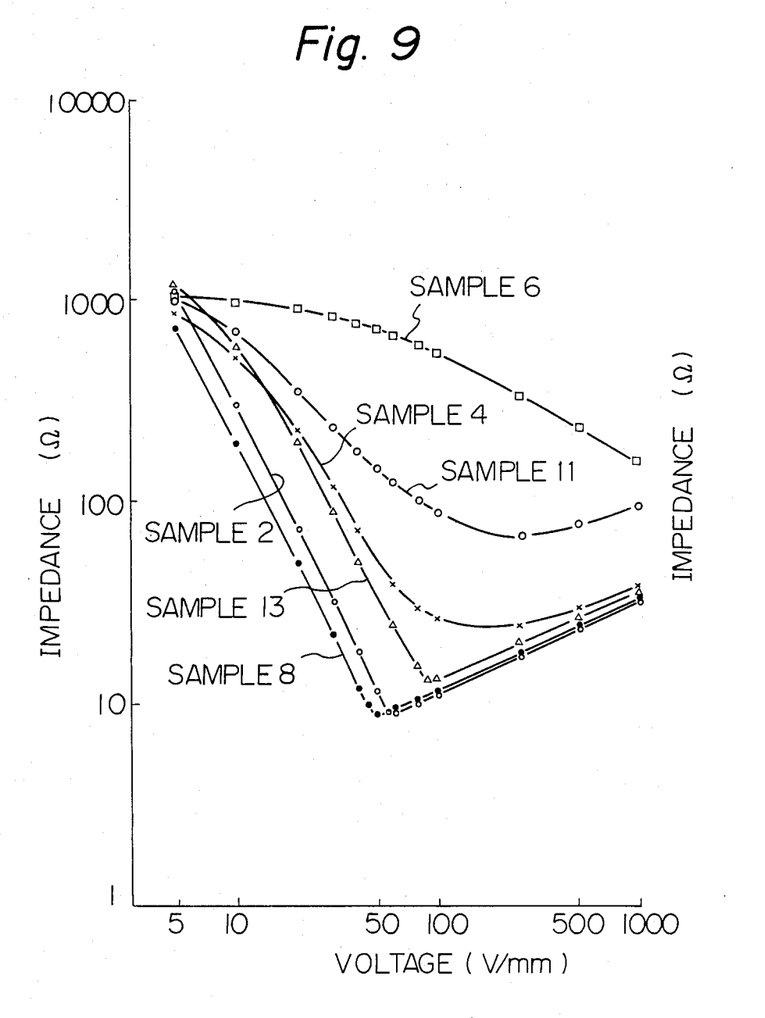

With regard to the sample of Example 1 exhibiting a satisfactory reduction in impedance, the type of the mineralizers (additives) added and the amount thereof were further examined. Among these, the most average samples are shown in Table 2 and FIG. 9. That is, 94 mol% of $BaTiO_3$ and 6 mol% of $BaSnO_3$ were mixed with an amount, as indicated in Table 2, of at least one additive selected from the group consisting of $MnCO_3$ and $Cr_2O_3$. The elements resulting from the mixtures were evaluated for wave form and impedance in a manner similar to that described in Example 1. In a case of all samples except for Nos. 6 and 12, the addition of the additive was effective for preventing reduction during the calcining procedure or for enhancing the sinterability, thereby producing a dense, uniform, excellent polycrystalline product. When the additives were added, for example, Mn was added in the form of $MnCO_3$ and Cr was added in the form of $Cr_2O_3$. However, the form of addition is not limited thereto. That is, when Mn and Cr are added in the form of other compounds, the same results can be secured. The amount of additive added is determined in consideration of the type of the compound added. For example, $Cr_2O_3$ is practically added in an amount of from 0.005 to 0.3% by weight, in terms of Cr based on the weight of the main component. A $Cr_2O_3$ amount exceeding 0.3% by weight in terms of Cr results in no substantial reduction in impedance of the resultant product. Also, $MnCO_3$ is practically added in an amount of from 0.005 to 0.3% by weight, in terms of Mn, based on the weight of the main component. A $Cr_2O_3$ or $MnCO_3$ amount less than 0.005% by weight in terms of Cr or Mn resulted in no effect.

EXAMPLE 3

Figure 10:
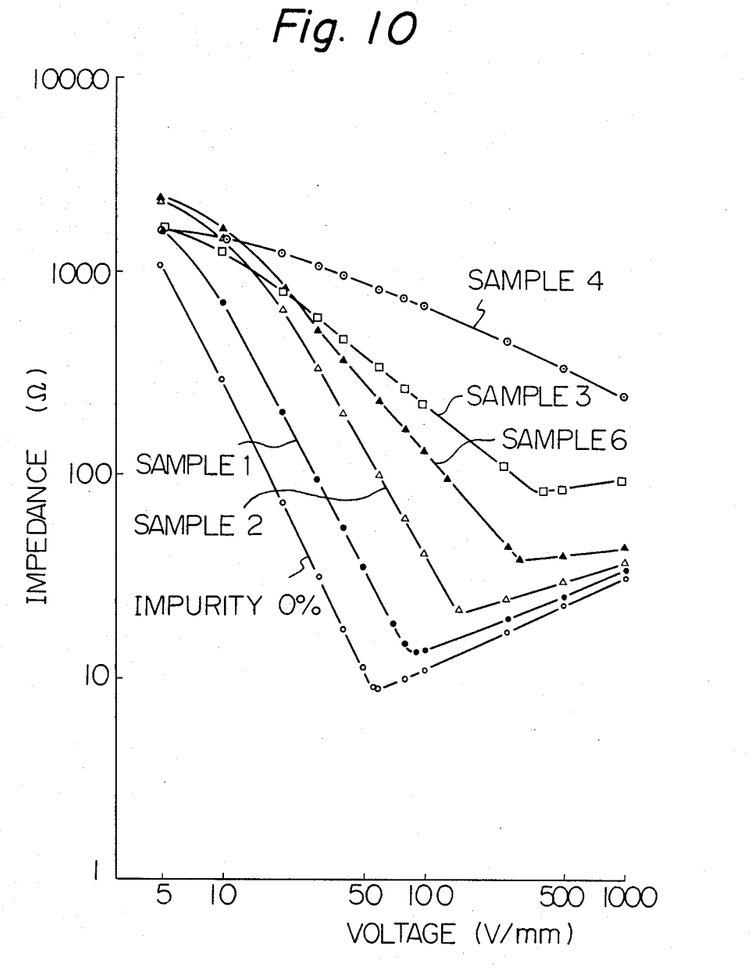

The sample of Examples 1 and 2 exhibiting satisfactory properties was mixed with an impurity which is contained in the starting materials or likely to be picked up during the production process, as indicated in Table 3, in an amount as indicated in Table 3. The elements resulting from the mixtures were evaluated for wave form and impedance in a manner similar to that described in Example 1. As is apparent from Table 3 and FIG. 10, sample Nos. 4 and 8 exhibited unsatisfactory properties. In order that these samples are capable of exhibiting a satisfactory reduction in impedance, the content of the impurity should be 0.5% by weight or less.

Figure 11:
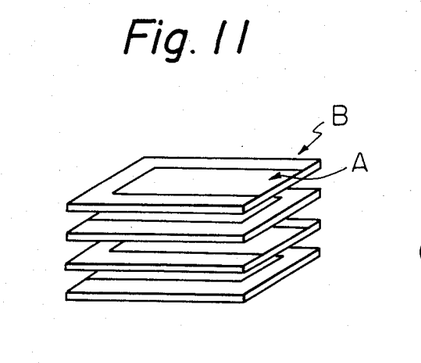
FIG. 11 is a view illustrating one embodiment of the structure of the current limiting element according to the present invention.

Also, the samples of Examples 2 and 3 were evaluated for voltage-current wave form in a manner similar to that described in Example 1. The samples exhibiting a high reduction in impedance gave an approximate wave form to that of the samples of Example 1.

mm was baked on a surface of each sheet. 20 pieces of the sheets were superimposed on each other as shown in

TABLE 1

| Sample No. | Composition (Mineralizer MnCO$_3$ = 0.01 wt %) | | Electric Characteristics (50 Hz) | | |
|---|---|---|---|---|---|
| | | | Impedance $Z_1$ with 5 volts/mm | Minimum Impedance $Z_2$ with 500 volts/mm | Ratio $\left(\dfrac{Z_2}{Z_1}\right)$ |
| 1 | BaTiO$_3$ + BaSnO$_3$ | 2 mol % | 1300 | 12 | 1/108 |
| 2 | BaTiO$_3$ + BaSnO$_3$ | 6 mol % | 970 | 9.2 | 1/105 |
| 3 | BaTiO$_3$ + BaSnO$_3$ | 10 mol % | 960 | 7.2 | 1/106 |
| 4 | BaTiO$_3$ + BaSnO$_3$ | 12 mol % | 680 | 7.0 | 1/97 |
| 5 | BaTiO$_3$ + BaSnO$_3$ | 16 mol % | 1050 | 19 | 1/55 |
| 6 | BaTiO$_3$ + SrTiO$_3$ | 4 mol % | 900 | 26 | 1/35 |
| 7 | BaTiO$_3$ + SrTiO$_3$ | 6 mol % | 800 | 18 | 1/44 |
| 8 | BaTiO$_3$ + SrTiO$_3$ | 8 mol % | 1100 | 21 | 1/52 |
| 9 | BaTiO$_3$ + BaZrO$_3$ | 4 mol % | 700 | 22 | 1/32 |
| 10 | BaTiO$_3$ + BaZrO$_3$ | 8 mol % | 500 | 21 | 1/24 |
| 11 | BaTiO$_3$ + BaZrO$_3$ | 12 mol % | 700 | 30 | 1/23 |
| 12 | BaTiO$_3$ + PbTiO$_3$ | 1 mol % | 1400 | 28 | 1/50 |
| 13 | BaTiO$_3$ + PbTiO$_3$ | 3 mol % | 1400 | 70 | 1/20 |
| X14 | PbTiO$_3$—Pb(Mg$_{\frac{1}{3}}$ Nb$_{\frac{2}{3}}$)O$_3$—Pb (Mn$_{\frac{1}{3}}$ Nb$_{\frac{2}{3}}$)O$_3$ 5 mol % + 95 mol % + 0.5 wt % | | 310 | 220 | 1/1.4 |
| X15 | (Pb0.962—Sr0.04)[(Nb$_{\frac{2}{3}}$—Co$_{\frac{1}{3}}$)0.01—Ti0.458—Zr0.532]O$_3$ + WO$_3$0.6 | | 230 | 78 | 1/2.9 |

TABLE 2

| No. | Composition | Additive | | Impedance $Z_1$ with 5 volts/mm | Minimum Impedance $Z_2$ with 500 volts/mm | Ratio $\left(\dfrac{Z_2}{Z_1}\right)$ |
|---|---|---|---|---|---|---|
| 1 | BaTiO$_3$ + BaSnO$_3$ 6 mol % | MnCO$_3$ | 0.005 wt % | 800 | 8.6 | 1/93 |
| 2 | " | MnCO$_3$ | 0.01 wt % | 1100 | 9.2 | 1/119 |
| 3 | " | MnCO$_3$ | 0.1 wt % | 900 | 12.0 | 1/75 |
| 4 | " | MnCO$_3$ | 0.2 wt % | 850 | 23.5 | 1/36 |
| 5 | " | MnCO$_3$ | 0.3 wt % | 1100 | 62.0 | 1/18 |
| X6 | " | MnCO$_3$ | 0.5 wt % | 1000 | 230.0 | 1/4.3 |
| 7 | " | Cr$_2$O$_3$ | 0.005 wt % | 700 | 8.0 | 1/88 |
| 8 | " | " | 0.01 wt % | 720 | 9.0 | 1/80 |
| 9 | " | " | 0.1 wt % | 800 | 10.5 | 1/76 |
| 10 | " | " | 0.2 wt % | 900 | 20.0 | 1/45 |
| 11 | " | " | 0.3 wt % | 980 | 58.0 | 1/17 |
| X12 | " | " | 0.5 wt % | 1050 | 108.0 | 1/9.7 |
| 13 | " | MnCO$_3$ Cr$_2$O$_3$ | 0.05 wt % 0.05 wt % | 1200 | 13.0 | 1/92 |
| 14 | " | MnCO$_3$ Cr$_2$O$_3$ | 0.1 wt % 0.1 wt % | 1000 | 32.5 | 1/31 |

TABLE 3

| Sample No. | Composition | Impurity | | Impedance $Z_1$ with 5 volts/mm | Minimum Impedance $Z_2$ with 500 volts/mm | Ratio $\left(\dfrac{Z_2}{Z_1}\right)$ |
|---|---|---|---|---|---|---|
| 1 | BaTiO$_3$ + BaSnO$_3$ + MnCO$_3$ 94 mol % + 6 mol % + 0.01 wt % | Al$_2$O$_3$ | 0.1 wt % | 1600 | 13.5 | 1/119 |
| 2 | BaTiO$_3$ + BaSnO$_3$ + MnCO$_3$ 94 mol % + 6 mol % + 0.01 wt % | Al$_2$O$_3$ | 0.3 wt % | 2250 | 21.5 | 1/105 |
| 3 | BaTiO$_3$ + BaSnO$_3$ + MnCO$_3$ 94 mol % + 6 mol % + 0.01 wt % | Al$_2$O$_3$ | 0.5 wt % | 1600 | 85 | 1/19 |
| X4 | BaTiO$_3$ + BaSnO$_3$ + MnCO$_3$ 94 mol % + 6 mol % + 0.01 wt % | Al$_2$O$_3$ | 0.7 wt % | 1600 | 340 | 1/4.7 |
| 5 | BaTiO$_3$ + BaSnO$_3$ + MnCO$_3$ 94 mol % + 6 mol % + 0.01 wt % | SiO$_2$ | 0.1 wt % | 1500 | 15 | 1/100 |
| 6 | BaTiO$_3$ + BaSnO$_3$ + MnCO$_3$ 94 mol % + 6 mol % + 0.01 wt % | SiO$_2$ | 0.3 wt % | 2350 | 39 | 1/60 |
| 7 | BaTiO$_3$ + BaSnO$_3$ + MnCO$_3$ 94 mol % + 6 mol % + 0.01 wt % | SiO$_2$ | 0.5 wt % | 1800 | 120 | 1/15 |
| X8 | BaTiO$_3$ + BaSnO$_3$ + MnCO$_3$ 94 mol % + 6 mol % + 0.01 wt % | SiO$_2$ | 0.7 wt % | 1500 | 500 | 1/3 |

EXAMPLE 4

Figure 12:
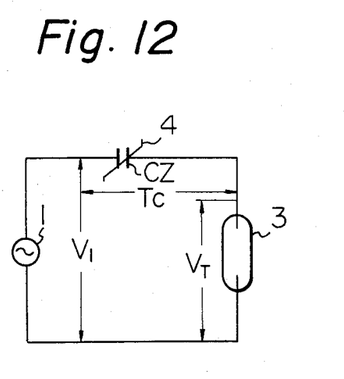
FIG. 12 is a circuit of the lighting apparatus according to the present invention.
Figure 13:
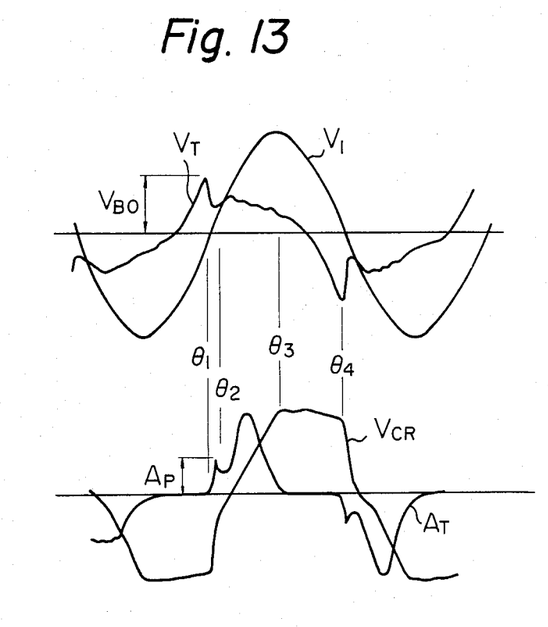
FIG. 13 is an operational wave form of each portion of the apparatus shown in FIG. 12.

Flat sheets measuring 12 mm × 12 mm × 0.6 mm were shaped from raw materials correspond to sample No. 2 of Table 1. A silver electrode measuring 11 mm × 11 mm was baked on a surface of each sheet. 20 pieces of the sheets were superimposed on each other as shown in FIG. 11. In FIG. 11, the symbol A represents the silver electrode and the symbol B represents the BaTiO$_3$ type dielectric. The element thus obtained was used in the circuit as shown in FIG. 12 as a current limiting element for a fluorescent discharge lamp. The voltage-current wave form was observed. The wave form of each portion is shown in FIG. 13. A current source of 100 V (50 Hz) was used. A discharge lamp effective current $A_T$ of 350 mA (r, m, s) was obtained. As is clearly apparent from the wave form of the discharge lamp current $A_T$ as shown in FIG. 13, the current $A_P$ at the phase $\theta_1$ is remarkably lower than that in a case of the conventional capacitor as shown in FIG. 2. Therefore, the element of this example exhibits an excellent lighting property.

Figure 14:
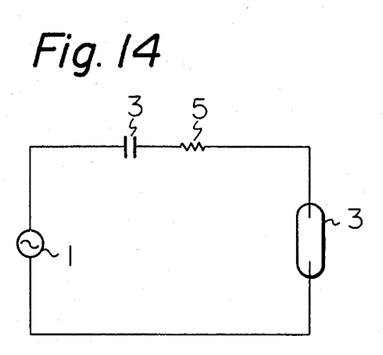
FIG. 14 is another circuit of the lighting apparatus of the present invention.

For the sake of reference, a lighting circuit using the conventional capacitor is shown in FIG. 14. In order to obtain a discharge lamp effective current of 350 mA, this circuit required a resistor 5 of 50Ω and a capacitor 3 of 10 μF (150 WVAC). The capacitor measured 50×30×55 mm and weighed 120 g. To the contrary, the element of the present invention measured 12×12×12 mm and weighed 12 g. It is apparent from the foregoing that the size and weight of the element of the present invention is remarkably smaller than those of the conventional element.

Figure 15:
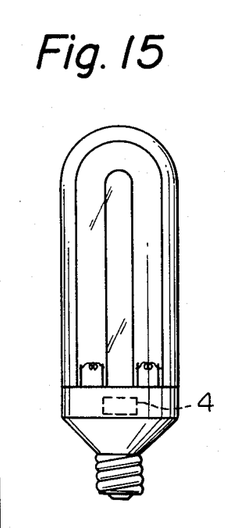
FIG. 15 is a view illustrating one embodiment of the structure of the discharge lamp according to the present invention.

One embodiment of a discharge lamp manufactured by fitting a fluorescent lamp in a lamp base of a conventional incandescent lamp by incorporating a current limiting element consisting of the element 4 of the present invention into the fluorescent lamp is shown in FIG. 15. In accordance with the present invention, a fluorescent lamp can be used in the same manner as the conventional incandescent lamp.

EXAMPLE 5

Figure 16:
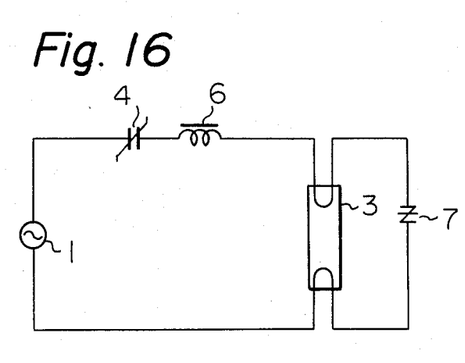
FIG. 16 is still another circuit of the lighting apparatus according to the present invention.
Figure 17:
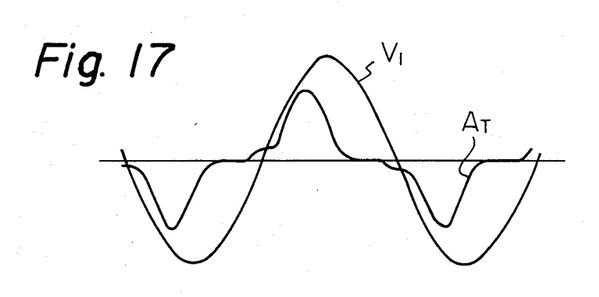
FIG. 17 is an operational wave form of each portion of the apparatus shown in FIG. 16.

A circuit in which an inductance 6 is incorporated in series with the element 4, which is effective for further reducing the discharge lamp current $A_p$, is shown in FIG. 16. The voltage wave form $V_1$ of the current source and the current wave form $A_r$ of the discharge lamp are shown in FIG. 17. The reference numeral 7 represents a bidirectional thyristor for pre-heating filaments. This circuit was operated under the same conditions as those described in Example 4, except for the inductance 6. The impedance of the inductance at 50 Hz was 5(V)/350(mA)=14(Ω). It is to be understood that a resistor may be used, in place of the inductance, so as to provide a reduction in $A_p$. Also in this case, the resistance value of the resistor can be reduced to a remarkable extent, as compared with a case where the conventional capacitor is used.

APPLICATION TO INDUSTRIES

As described hereinabove, in the case where the $BaTiO_3$ type ceramics exhibiting a high reduction in impedance during the application of an alternating voltage, which were obtained in Examples 1, 2 and 3, are used as a current limiting element for a lighting circuit for a discharge lamp, the resultant lighting apparatus is extremely small in size and weight as compared with a lighting apparatus using the conventional capacitive element. As is apparent from the alternating voltage characteristic of the element of the present invention, the current of the element during discharge is kept low. Therefore, the inductance or resistance which is used in series with the capacitive element can be removed. Even if necessary, the inductance or resistance used can have only a very small capacitance or resistance, with the result that the power loss generated is low and the resultant lighting apparatus can have a small size and weight. Accordingly, the element of the present invention is very useful for use in a lighting apparatus for a discharge lamp.

We claim:

1. A lighting apparatus for a discharge lamp comprising a discharge lamp and a current limiting device connected in series with said discharge lamp, wherein said current limiting device is composed of a ferroelectric polycrystalline ceramic having an impedance ratio $Z_1/Z_2$ of a fractional value of 1/10 or less where the impedance $Z_1$ is calculated from the current value measured at an alternating field of 5 V/mm and the impedance $Z_2$ is calculated from the current value measured at an alternating field of 500 V/mm or less, said ferroelectric ceramic comprising mainly barium titanate ($BaTiO_3$) in which a part of Ba in the $BaTiO_3$ is replaced with Sr or Pb and a part of Ti in the $BaTiO_3$ is replaced with Zr or Sn and a mineralizer consisting of 0.005 to 0.3% by weight of Cr, 0.005 to 0.3% by weight of Mn, or a combination thereof.

2. A lighting apparatus for a discharge lamp as claimed in claim 1 further comprising a resistor or an inductance connected in series therewith.

3. A lighting apparatus for a discharge lamp as claimed in claim 1 or 2 wherein said ferroelectric polycrystalline ceramic has a laminated structure comprising a plurality of ceramic layers and internal electrode layers between said ceramic layers, said internal electrode layers being connected together alternately.

4. A lighting apparatus for a dicharge lamp as claimed in claim 1 or 2 wherein said polycrystalline ceramic contains impurities derived from the starting material which total 0.5% or less by weight.

* * * * *